Jan. 3, 1956 — A. ENGEL — 2,729,493
IMPLEMENT FOR LIFTING AND TRANSPLANTING PLANTS
Filed Aug. 26, 1952

INVENTOR
Anton Engel
by Armand E. Mestern
Attorney

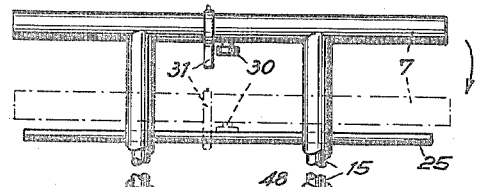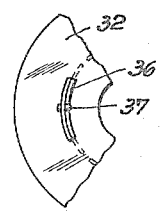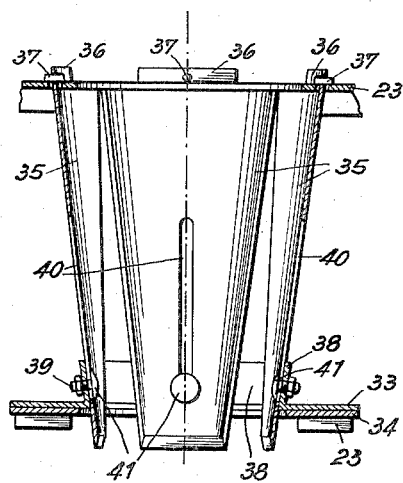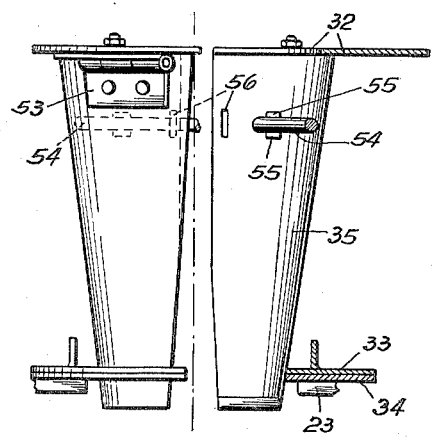

United States Patent Office 2,729,493
Patented Jan. 3, 1956

2,729,493

IMPLEMENT FOR LIFTING AND TRANSPLANTING PLANTS

Anton Engel, Flossenburg, near Weiden, Oberpfalz, Germany

Application August 26, 1952, Serial No. 306,356

13 Claims. (Cl. 294—50.8)

The object of the invention is to provide simple and efficient means whereby living trees, shrubs and other plants with their roots and the earth about them can be lifted out of the ground in such a manner that all lifted root balls have an equal conical shape fitting exactly into planting holes cut into the earth by means of an earth borer of the same conical shape, or in pots of the same conical shape, so that the plants can be inserted with their root balls without injury.

The implement for lifting and transplanting plants consists of two frame parts displaceably arranged one along the other, the one frame part carrying in circularly arranged bearings a plurality of blades wedge-shaped in their longitudinal direction and forming a part of a circle in cross-section completing the surface of a truncated cone, and the other frame part containing circularly arranged supports of such a diameter, that the blades when sliding along these supports downwardly complete a truncated cone beneath the same.

To admit an exact rectilinear displacement of the blades the bearings of the first frame part may consist of radial slots in an annular disk through which the blades pass with guide pins displaceably secured by bolts. The blades may be pivotally mounted with the same effect for instance by hinges on an annular disk of the first frame part preferably on smaller implements.

The invention is illustrated in the accompanying drawings:

Fig. 5 is a front view of an implement in reduced scale of a different embodiment.

Fig. 6 is a longitudinal section through the blade cone in open state.

Fig. 7 is a plan view of one part of the bearing disk showing the mounting of one blade.

Fig. 8 shows a modified embodiment of the blade cone, the left half in back view and the right half in longitudinal section in back view.

Figure 1:
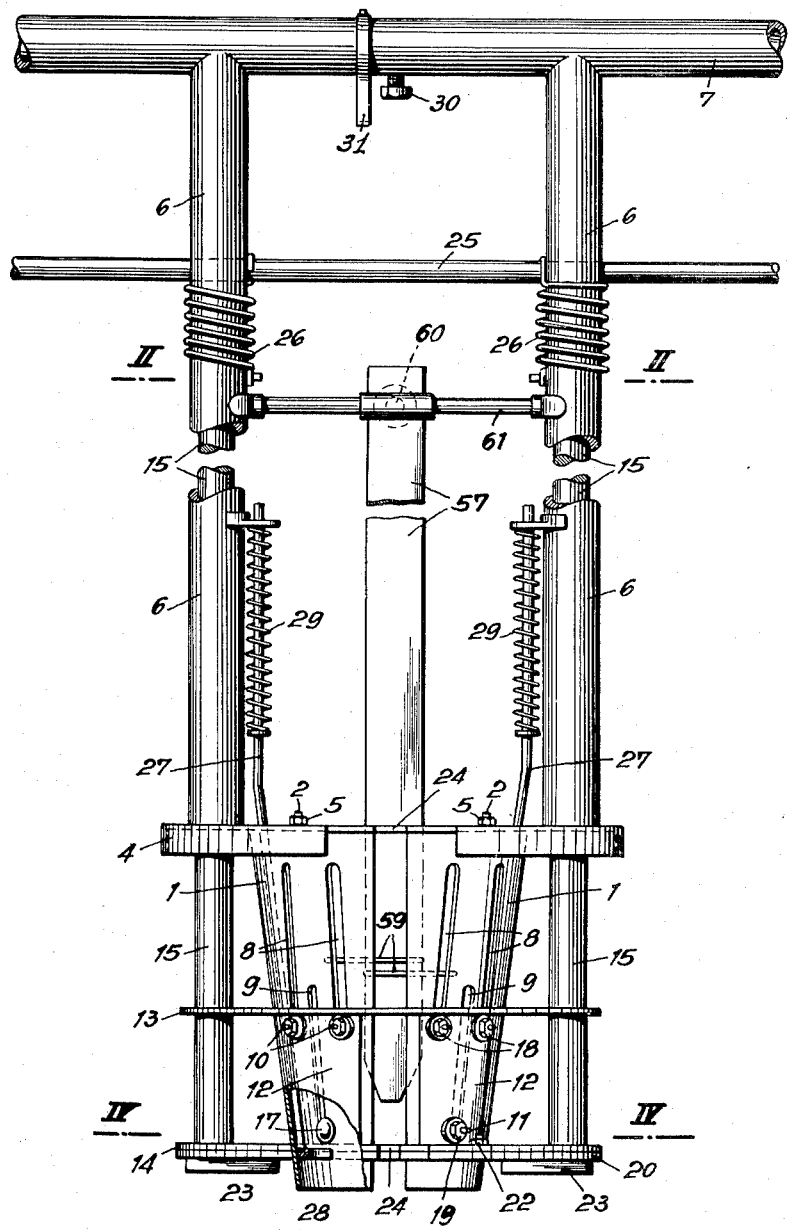
Fig. 1 is a front view of the implement with open blade cone.

The blades 1 according to Figs. 1–4 and the blades 35 according to Figs. 5–8 are wedge-shaped in their longitudinal direction and form in their cross-section a part of a circle, preferably a quarter of a circle. They are thus shaped that they form the complete surface of a truncated cone. In the middle of their upper edge they are provided with a threaded guide pin 2 passing through radial slots 3 of an upper annular disk 4. A nut 5 thus secures these blades in their position to allow their displacement in their radial direction. The annular disk 4 is fixed on the lower end of two parallel posts formed by tubes 6 of the one frame part which have a cross handle 7 on their upper end.

Each blade 1 is provided with three parallel slots, of which two slots 8 are arranged in the upper part and a middle slot 9 in the lower part of the blades. Through these longitudinal slots 8 and 9, guide pins 10, 11 pass and are fixed on connecting pieces or webs 12. These connecting pieces or webs correspond to the number of the blades and have the same conical shape; they thus support the outer circumference of the blades with their own inner circumference. These webs are fixed between two annular disks 13, 14 fastened at a distance from one another to posts formed by rods or tubes 15, which are capable of telescoping within the tubes 6. The inner diameter of the two annular disks 13, 14 decreases in downward direction corresponding to the cone diameter of the blade cone. The guide pins 10, 11 are provided on the inner surface of the blades with flat heads 16, 17, and on the outer surface of the webs with nuts 18, 19. By means of this guide it will be achieved that the blades 1 will be displaced exactly rectilinearly in their longitudinal direction.

A further annular disk 20 is arranged under the lower annular disk 14 being displaceably connected in its circumferential direction with the disk 14 by means of a circular slot 21 and an engaging guide pin 22. This lower annular disk 20 serves as a bottom disk on the lower side of which blades 23 are provided so that the implement can be pushed into the earth.

Figure 2:
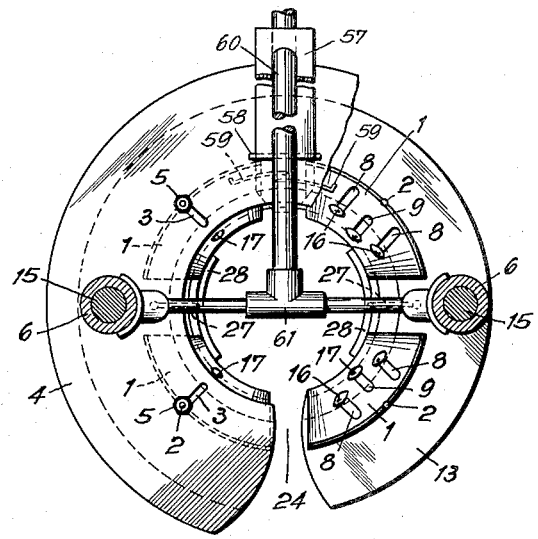
Fig. 2 is a plan view according to line II—II of Fig. 1.
Figure 3:
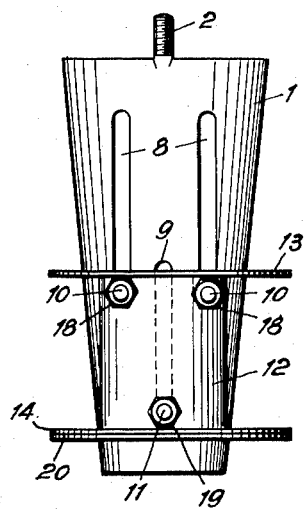
Fig. 3 shows a blade with its guide members from outside.
Figure 4:
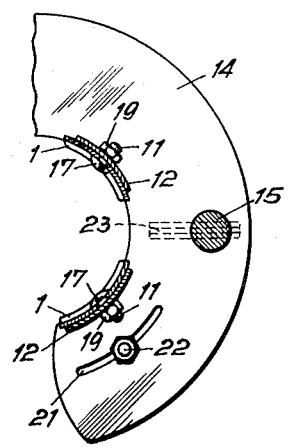
Fig. 4 is a section according to line IV—IV of Fig. 1.

On a division point of the blade cone where two blades meet all annular disks are provided with a radial passing slot 24 to admit the implement to be placed on bigger plants from the side. Parallel to the cross handle 7 the rods or tubes 15 are provided with a handle 25 passing outwardly through lateral slots 6' of the tube 6. Springs 26 pull the handle 25 from the cross handle 7 and simultaneously the annular disks 13, 14 from the annular disk 4 downwardly and the blades 1 are set into the open position, as illustrated in Figs. 1 and 2. To strip the earth from the blades when they are drawn upwardly strippers 28 are arranged inside the blade cone fixed to rods 27 along the tubes 6. Under the action of a compression spring 29 these strippers 28 are pressed downwardly.

A stop 30 and a bolt 31 are arranged on the cross handle 7 to bolt the handle 25 when the handle 7 is pressed down against the same and the blade cone is closed.

For cutting taproots, a long blade 57 is provided parallelly displaceable to the inner surface of the blade cone. This blade 57 passes through a slot 58 in the annular disk 4 and between holders 59 fastened on the inner surface of the blade cone. A handle 60 is pivotal around a connecting rod 61 turnably mounted between the tubes 6, and passes through the blade 57.

According to Figs. 5–8 an annular disk 32 is fixed to the lower end of the tube 6, and annular disks 33, 34 corresponding to the annular disks 14, 20 according to Fig. 1, to the rod or tube 15. The wedge shaped and circular blades 35 are provided with upwardly projecting parts 36 which are inserted into slots of corresponding circular shape of the annular disk 32 and are secured in their position by bolts 37. The disk 32 is fixed on the tubes 6 of the one frame part, within which the rods or tubes 15 are capable of telescoping. The blades are pivotally supported against the inner circumference of an annular disk 33. The size of the inner diameter of this disk is thus that the blades when moved downwardly complete a closed truncated cone. The bottom disk 34 with its blades 23 is turnably arranged underneath the annular disk 33, as described above.

On the annular disk 33 is fastened a ring 38 projecting upwardly and of the corresponding conical shape of the closed blade cone carrying a guide pin 39 for each blade. These pins 39 engage with longitudinal slots 40 in the blades and are provided with flat heads 41 on the inner circumference of the blade cone guiding the blades along the ring 38.

By means of a compression spring 42 arranged between the annular disks 32, 33 both frame parts are pushed apart up to the stop of the cross handle 7, this stop being formed by lateral slots 6′ in the tube 6, and the blades are in the open state in the frame, as illustrated in Figs. 5 and 7.

Small strippers 28 (Fig. 2) arranged within the blade cone in about the height of the annular ring 33 are fixed on rods 43 which are displaceable upwardly against the action of a compression spring 44 which, at the one hand, abuts against a ring 45 fixed on the rod and, at the other hand, against a strap 46. This strap 46 is turnable around a pin 47 of a rod 48 fixed between both tubes 6.

To insert the implement from the side of the plant the annular disks 32, 33, 34 are provided with radial slots 49, 50, 51 at one blade division point. The edges of both blades 35 pointing to the slots 49, 50, 51 are recessed in their upper part at 52 to form a slot throughout the height of the blade cone.

Fig. 7 shows an arrangement where the blades are pivotally fixed on the upper annular ring 32 by a hinge 53. The blades 35 are pressed against the inner circumference of the annular ring 38 by an annular spring 54. This spring is supported in its height by parts 55 projecting from the blades. To prevent the ring from being displaced, stops 56 are arranged on the inner surface of both blades 35 pointing to the radial slots 49, 50, 51.

The implement is operated as follows: The implement is set on the plant either from the top or from the side in such a way that the plant is placed in the middle of the open blade cone. On pressing the cross handle 7 down and moving the same to and fro the blades 1, 35 cut into the earth. The implement rests on the bottom ring 20, 34 and the slot 21 admits the movement to and fro of the two frame parts. As soon as the blades are inserted into the ground forming a closed blade cone, as illustrated in Fig. 5 in dotted lines, the handle 25 hits against the stop and is locked by the bolt 31. While the blades are inserted into the earth, the strippers 28 which rest on the ground are pressed upwardly whereby the springs 44 are compressed. The plant with its root ball is now cut out of the earth. When the implement is removed the closed blade cone lifts the plant with its root ball and takes it without injury to a hole or pot of exactly the same shape of the blade cone, so that a perfect fitting can be achieved when the plant is inserted therein. To remove the plant with its root ball from the implement, the bolt 31 is released and the handle 25 is pressed off the handle 7 assisted by the spring 26 or 42. The blade cone is opened and the plant with its root ball drops.

The strippers 28 are pressed downwardly under the action of the springs 44 and strip the ball from the blades when they are withdrawn into the frame, and thus prevent earth from adhering thereto.

Having now described my invention, what I claim as new and desire to secure by Letters Patent, is:

1. An implement for lifting and transplanting plants of the type including a two-part frame having an upper part and a lower part, operating means for said implement on said upper frame part, and means for mounting cutting members on said frame, said mounting means including an annular plate with circularly arranged elements for supporting said cutting members, said cutting members consisting of a plurality of blades shaped to form together upon downward movement a shell of frusto-conical form, two annular disks on said lower frame part, arranged one above the other in spaced relationship, conforming with their open inner edges to a frusto-conical shell, a plurality of guide members mounted on said disks so as to extend therebetween and capable of guiding said cutting blades for downward movement, thereby moving them from open-shell to closed-shell position.

2. An implement according to claim 1, wherein said upper and lower frame parts are movable vertically with respect to each other and wherein said annular disks are provided with a radial passage slot on a division point of the blades to permit the implement to be placed on plants from the side.

3. An implement for lifting and transplanting plants of the type including a two-part frame having an upper part and a lower part, said lower part being movable vertically with respect to said upper part, means on said upper frame part for manually operating said implement, and means for mounting cutting members on said frame, said mounting means including an annular supporting plate with circularly arranged slots for radial displacement of said cutting members, said cutting members consisting of a plurality of blades wedge-shaped in their longitudinal direction and capable of forming together upon downward movement a shell of closed frusto-conical form, an element on each cutting blade for engagement with one of said slots, two annular disks on said lower frame part, arranged one above the other in spaced relationship, conforming with their open inner edges to the lower part of said frusto-conical shell when the latter is in closed position, a plurality of webbed guide members mounted on said disks so as to extend therebetween and capable of guiding said cutting blades for downward movement, thereby moving them from open-shell to closed-shell position.

4. An implement for lifting and transplanting plants according to claim 3, wherein each cutting blade has a plurality of longitudinal slots and each web a corresponding member of guide elements for engagement with said slots so as to insure vertical travel of said blades upon downward movement thereof.

5. An implement for lifting and transplanting plants according to claim 4, wherein said longitudinal slots are parallel and in staggered relationship to one another.

6. An implement for lifting and transplanting plants according to claim 5, wherein an annular bottom disk is provided below said lower annular web-supporting disk, both disks being connected for to-and-fro-movement by a circular slot and a pin.

7. An implement for lifting and transplanting plants of the type including a two-part frame having an upper part and a lower part, means for operating said implement on the upper frame part, and means for mounting cutting members on said frame, said mounting means including an annular plate with circularly arranged bearing elements for pivotally supporting said cutting members at their upper ends, said cutting members consisting of a plurality of blades shaped to form together upon downward movement a shell of frusto-conical form, two annular disks on said lower frame part, arranged one above the other in spaced relationship conforming with their open inner edges to the lower part of said frusto-conical shell when the latter is in closed position, a plurality of guide members mounted on said disks so as to extend therebetween and being capable of guiding said cutting blades for downward movement, thereby moving them from open-shell to closed-shell position.

8. An implement according to claim 7, wherein said blades are provided with upwardly projecting elements passing through slots of said annular supporting plate and secured thereto by bolts, and are further provided with longitudinal slots for engagement with projecting pins on said guide members in the lower frame part, said pins being provided with flat heads on the inner circumference of the blades.

9. An implement according to claim 7, wherein a spring is provided for pressing said cutting blades against the inner circumference of said annular disks.

10. An implement for lifting and transplanting plants of the type including a two-part frame having an upper part and a lower part, operating means for said implement on said upper frame part, and means for mounting cutting members on said frame, said mounting means including an annular plate with circularly arranged elements for supporting said cutting members, said cutting members consisting of a plurality of blades shaped to form together upon downward movement a shell of frusto-conical form, two annular disks on said lower frame part, arranged one above the other in spaced relationship, conforming with their open inner edges to a frusto-conical shell, a plurality of guide members mounted on said disks so as to extend therebetween and capable of guiding said cutting blades for downward movement, thereby moving them from open-shell to closed-shell position, said upper frame consisting of two upright parallel tubular posts with a cross handle at their upper ends, said lower frame parts consisting likewise of two posts with a cross handle, said last-mentioned posts being telescopable within the posts of said upper frame part, said tubular posts having lateral slots for passage of said second posts therethrough.

11. An implement according to claim 10, wherein each frame part comprises a spring for pulling said frame parts away from each other, and means on both parts for detachable locking thereof in telescoped position.

12. An implement according to claim 10, comprising strippers arranged within the blades in the height of the lower annular disk, and rods yieldingly mounted on the first frame part for supporting said strippers.

13. An implement according to claim 12, comprising mounting means for the supporting rods of said strippers, which means include a rod secured between said upper frame posts, a pin on said rod, a strap rotatably mounted on said pin, and two springs abutting with one of their respective ends against said strap and with their other ends against a ring on each of the supporting rods.

References Cited in the file of this patent

UNITED STATES PATENTS

| | | |
|---|---|---|
| 103,082 | Roberts | May 17, 1870 |
| 191,320 | Disston | May 29, 1877 |
| 541,841 | Doyle | July 2, 1895 |
| 594,668 | Wilkens | Nov. 30, 1897 |
| 1,328,063 | St. Johns | Jan. 13, 1920 |

FOREIGN PATENTS

| | | |
|---|---|---|
| 412,407 | Great Britain | June 28, 1934 |